United States Patent
Latraverse

(10) Patent No.: US 7,570,041 B2
(45) Date of Patent: Aug. 4, 2009

(54) MAGNETIC FIELD POSITION SENSOR AND METHOD OF USE

(75) Inventor: François Latraverse, St-Roch de Richelieu (CA)

(73) Assignee: Distribution Gablex Inc., Sorel, Québec (CA)

( * ) Notice: Subject to any disclaimer, the term of this patent is extended or adjusted under 35 U.S.C. 154(b) by 0 days.

(21) Appl. No.: 12/093,759

(22) PCT Filed: Nov. 16, 2005

(86) PCT No.: PCT/CA2005/001742

§ 371 (c)(1),
(2), (4) Date: Jul. 24, 2008

(87) PCT Pub. No.: WO2007/056836

PCT Pub. Date: May 24, 2007

(65) Prior Publication Data

US 2008/0290864 A1    Nov. 27, 2008

(51) Int. Cl.
*G01V 3/08* (2006.01)
(52) U.S. Cl. .................. 324/67; 324/228
(58) Field of Classification Search ............ 324/66–67, 324/22, 228, 326, 329, 662; 340/686.1, 686.6
See application file for complete search history.

(56) References Cited

U.S. PATENT DOCUMENTS

| | | | |
|---|---|---|---|
| 1,971,189 A | 8/1934 | Leibing |
| 3,836,848 A | 9/1974 | Blevins |
| 4,998,058 A | 3/1991 | Tofte et al. |
| 5,434,500 A | 7/1995 | Hauck et al. |
| 6,927,560 B2 | 8/2005 | Pedigo et al. |

*Primary Examiner*—Bot LeDynh
(74) *Attorney, Agent, or Firm*—Ogilvy Renault LLP

(57) ABSTRACT

A magnetic field position sensing device for sensing the position, on a front surface of a wall, of a magnet of known magnetic field intensity secured to a rear surface of the wall. The sensing device has a magnetic field transducer which produces signals proportional to the strength of the magnetic field detected. These signals are treated in a microcontroller and compared to a reference signal value representative of the magnetic field intensity of the magnet, when not obstructed, whereby to generate signals to a display device which displays a numerical value indicative of the thickness of the wall. Audible/visual signaling devices are also provided whereby to direct the movement of the sensing device by a user person to locate same on the front surface of the wall substantially adjacent the magnet and this is accomplished by displacing the sensing device in a diminishing spiral path.

13 Claims, 3 Drawing Sheets

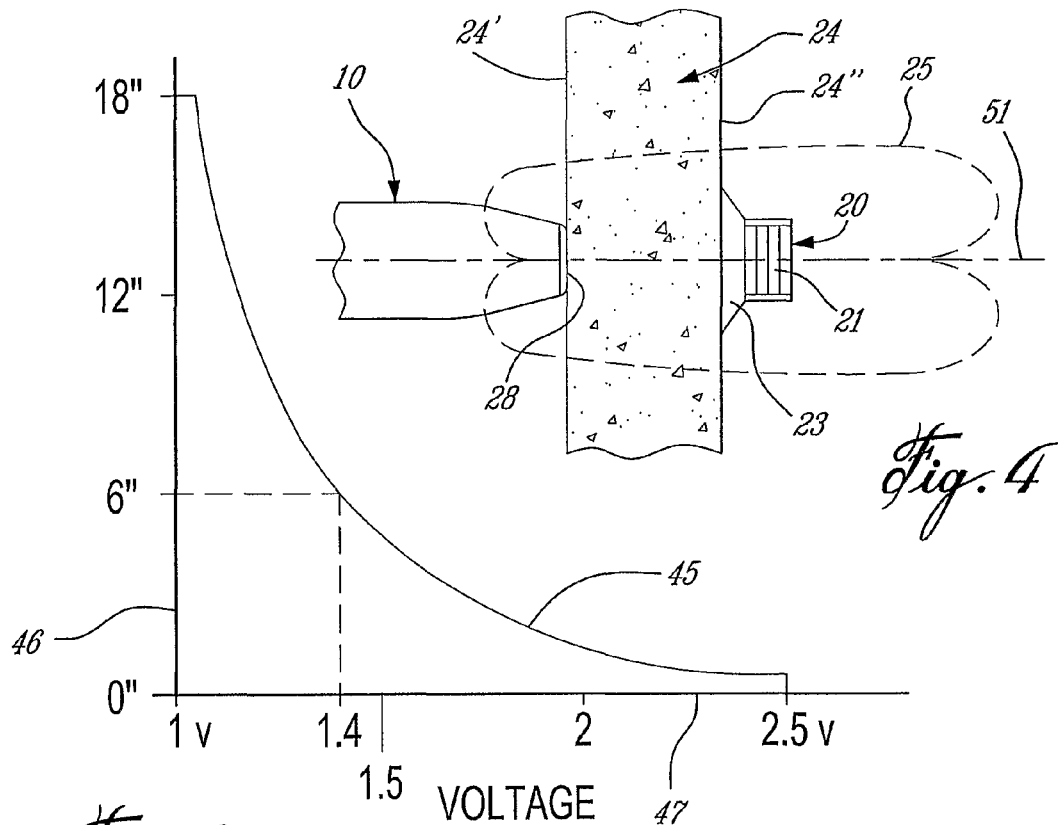
Fig. 3
Fig. 4
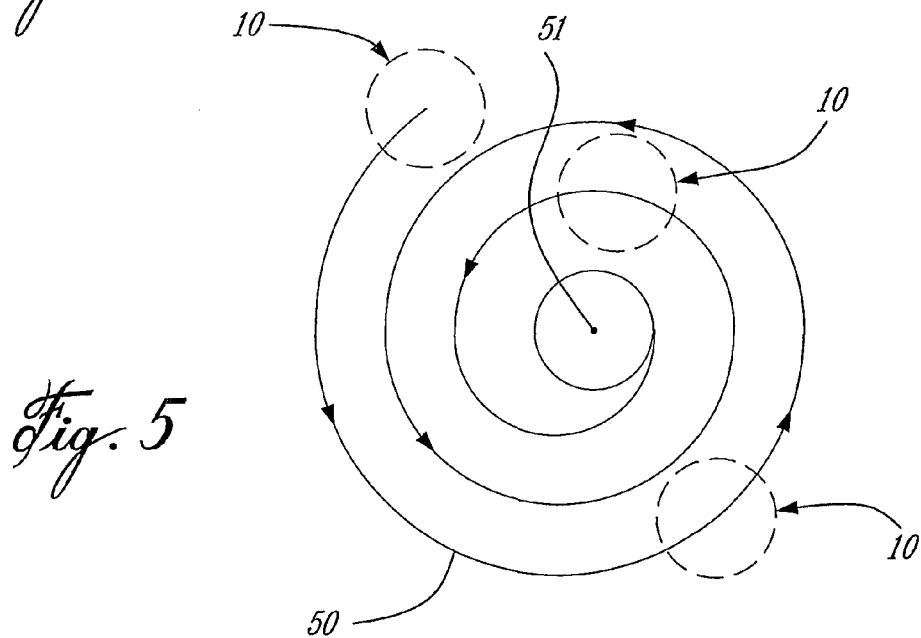
Fig. 5

MAGNETIC FIELD POSITION SENSOR AND METHOD OF USE

TECHNICAL FIELD

The present invention relates to a magnetic field position sensing device for sensing the position, on a front surface of a barrier such as a wall, of a magnet of known magnetic field intensity which is secured to a rear surface of the wall.

BACKGROUND ART

Position indicators using magnetic field detectors is known and an example of such device is described in U.S. Pat. No. 5,434,500 issued on Jul. 18, 1995. That device uses a magnetic field generator and a receiving or detecting unit which is able to detect the magnetic field on an opposed side of a barrier. The magnetic field generator is placed on a first side of the barrier at a spot to be located and creates a magnetic field at that spot. The receiving unit is composed of four detectors which measure the relative strength of the magnetic field at each detector and this allows the position of the source to be determined. The strength of the field is indicated by light emitting diodes. When the strength of the field is equal at all for points the receiving unit is centered approximately on that point on the opposite side of the barrier from the sending unit. The receiving unit has a center hole therein to introduce a pencil to mark a position on the surface of the barrier. Such device has been found adequate to locate the position of the center of the receiving unit from the other side of the barrier but it is fairly bulky and expensive to produce. When the wall is thick and dense, the device may not perform adequately.

There is also a need for such devices to detect the thickness of a barrier whether it is a concrete wall barrier or a wooden wall structure as we commonly find in home construction. There is also a need to provide a device which can be carried in the pocket of a user person and which is inexpensive to produce and easy to use and which provides accurate measurements of the thickness of a barrier as well as the location of a magnet generating a magnetic field attach to an opposed surface of that barrier.

DISCLOSURE OF INVENTION

It is therefore a feature of the present invention to provide a magnetic field position sensing device which meets the above need of the prior art and which is miniaturized whereby to be carried in a pocket of a user.

Another feature of the present invention is to provide a method of sensing a magnetic field, on a front surface of a barrier, of a magnet secured to a rear surface of the barrier to locate the position of the magnet and determine the thickness of the barrier.

According to the above features, from a broad aspect, the present invention provides a magnetic field position sensing device for sensing the position, on a front surface of a barrier, of a magnet of known magnetic field intensity secured to a rear surface of the barrier. The magnet has attachment means to retain it on a barrier surface. The sensing device has a housing in which is mounted a linear magnetic field transducer which generates output voltage signals to a microcontroller proportional to a detected magnetic field intensity of the magnet. The microcontroller has a reference signal value stored in a memory thereof and qualibrated to a maximum signal strength of the magnet when positioned directly adjacent the transducer without obstruction. A digital display device is connected to the microcontroller for displaying a visual digital value of the detected magnetic field intensity which is indicative of the thickness of the barrier. Audible/visual means is provided for transmitting an audible/visual signal representative of measured audible/visual means values of field intensity as the transducer is displaced on the front wall surface by moving the housing in a diminishing spiral path to locate a center position of the magnet where the magnetic field intensity is the greatest and modifying the visual digital value display accordingly whereby to locate the position of the magnet relative to the front surface of the barrier and determining the thickness thereof.

According to a further broad aspect of the present invention there is further provided a method of sensing a magnetic field, on a front surface of a barrier, of a magnet secured to a rear surface of the barrier to indicate the position of the magnet and the thickness of the barrier. The method comprises attaching a magnet of known magnetic field intensity to a location on the rear surface of the barrier. A sensing device is placed on the front surface of the barrier with a linear magnetic field transducer of the device being positioned adjacent the front surface. An audible/visual signal is emitted by the sensing device and is observed and the sensing device is displaced in a diminishing spiral path, as indicated by an increasing value of the audible/visual signals, to locate a center position of the magnet A numerical measurement value is displayed on the sensing device and indicative of the thickness of the barrier.

BRIEF DESCRIPTION OF THE DRAWINGS

A preferred embodiment of the present invention will now be described with reference to the accompanying drawings in which:

FIG. 3 is a characteristic curve indicating the field intensity of a magnet utilized with the sensing device and displaying the voltage output of a transducer relative to the thickness of a barrier placed between the transducer and the magnet;

FIG. 4 is a schematic illustration showing the magnet secured to one surface of a concrete wall barrier with the sensing device displaced on the opposed surface thereof; and FIG. 5 is a schematic illustration showing the displacement pattern of the sensing device to locate the center position of the magnet.

MODES FOR CARRYING OUT THE INVENTION

Figure 1:
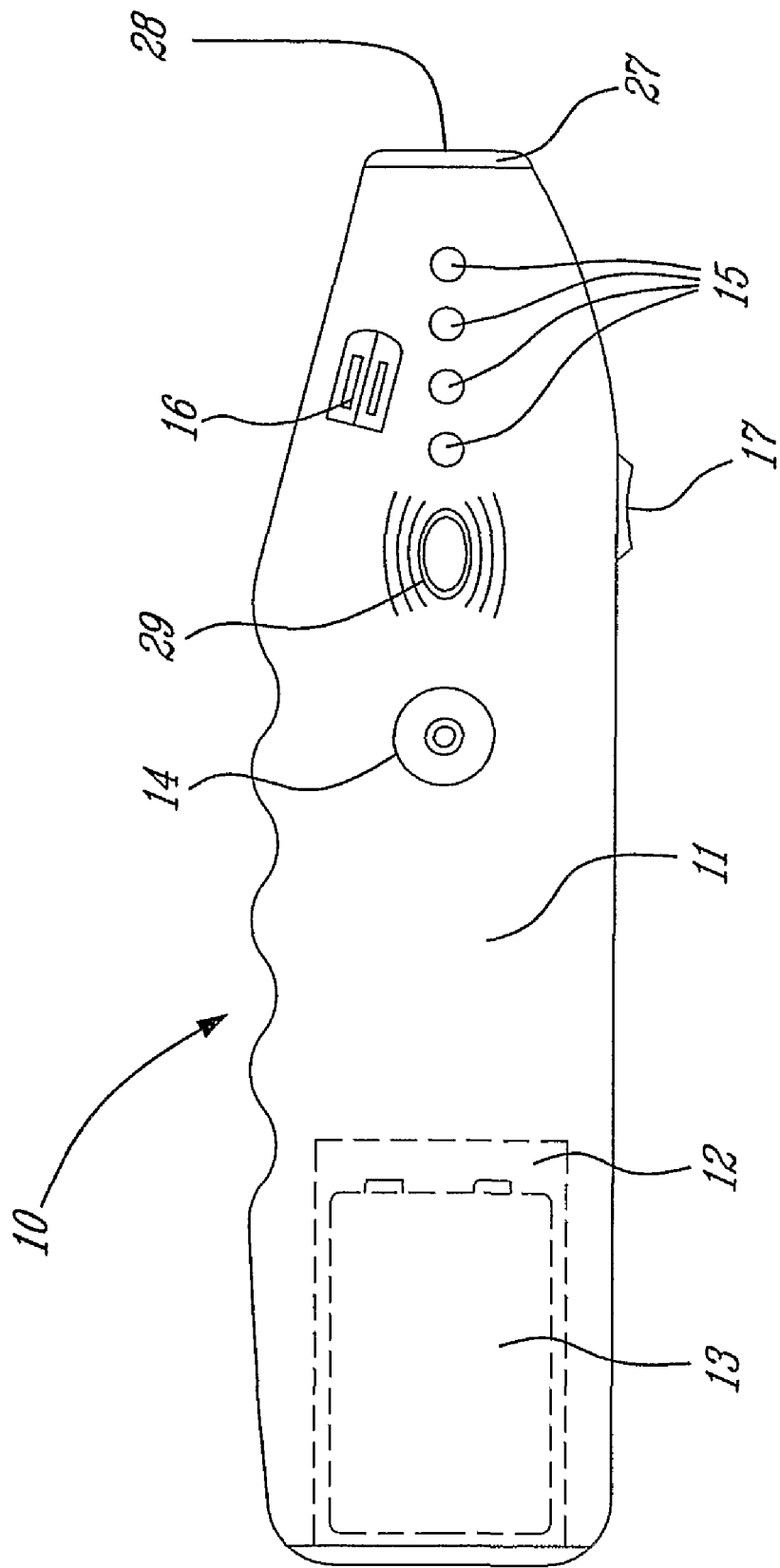
FIG. 1 is a side elevation view of a magnetic field position sensing device constructed in accordance the present invention.

Referring now to the drawings and more particularly to FIG. 1, there is shown generally at 10, the magnetic field position sensing device of the present invention. It comprises a housing 11 configured to be held in the hand of a user person and having a battery receiving cavity 12 at one end thereof for receiving a 9 volt dc battery 13 therein. A level vial 14 may be incorporated in a surface of the housing 11 to assist in positioning the housing in a substantially horizontal plane against a barrier surface. This level vial is not an essential element of this invention.

The housing 11 is further provided with two or more light emitting diodes 15, herein four, to indicate the measured signal values detected by the sensing device as it is displaced to assist the user to detect the center position of a magnet located on an opposed side of a barrier. Digital display diodes are also provided as indicated by reference numeral 16 whereby to provide a visual digital display indicative of a thickness of the barrier being measured by the sensing device 10. A switch 17 switches the electronic circuit of the sensing device "on" and "off" whereby to reset the device after use. A piezoelectric crystal 29 generates a sound signal which varies in tone depending on the intensity of the detected magnetic field.

With the sensing device 10 of the present invention there is utilized a magnet of known magnetic field intensity and it may have various constructions and attachment means whereby to secure same to a surface of a barrier. As shown in FIG. 4, the magnet 20 is comprised of a plurality of magnetic wafers 21, of known magnetic strength, and which are retained together by this magnetic field attraction and may be located in a non-metallic support such as a plastic shroud 22 or encased in a plastic shroud secured to a suction cup 23. The suction cup could have many shapes such a siphon type cup whereby to retain the magnet on the wall surface. The magnetic field strength or field intensity of the magnet is adjusted, depending on its intended use, by adding or removing magnetic wafers from the magnet assembly.

As shown in FIG. 4 the magnet 20 is positioned adjacent a barrier which is herein illustrated by a concrete wall 24 at a location where it is desirable to drill a hole for the passage of wiring or piping. The magnet 20 generates a magnetic field 25 which penetrates the concrete wall and is therefore detectable from the other surface which we will herein refer to as the front surface 24' of the concrete wall. The magnet is secured to the rear surface 24" of the concrete wall. Before describing the method of operation of how to detect this magnetic field at the approximate center thereof, reference will now be made to FIG. 2 which shows the construction of the electronic circuit of the sensing device.

Figure 2:
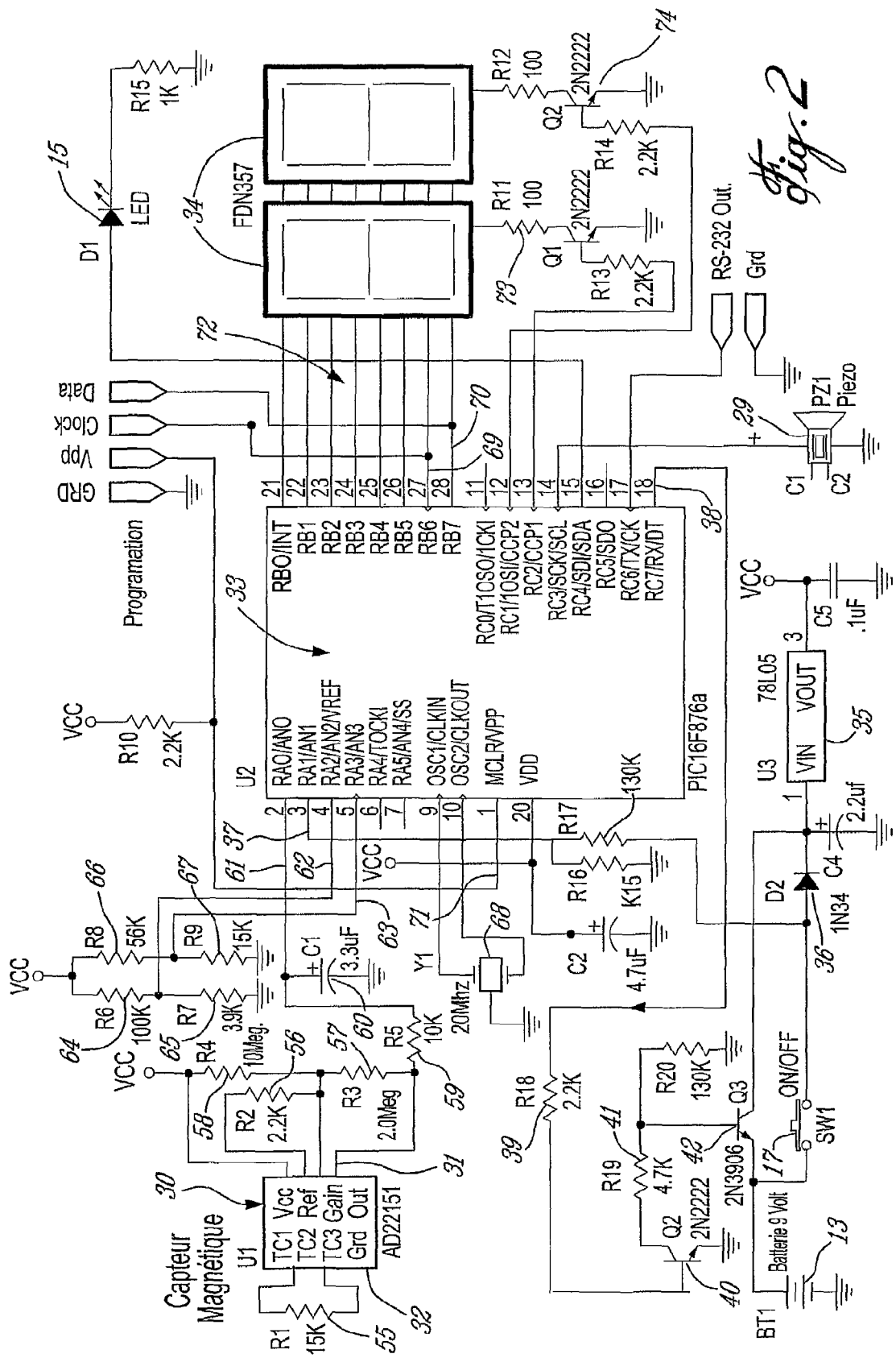
FIG. 2 is a schematic circuit diagram, partly in a block form, illustrating the construction of the electronic circuitry of the sensing device.

As shown in FIG. 2 the circuitry of the sensing device is provided at an input end thereof with a linear magnetic field sensor 30 which produces output voltage signals at its output 31 which are proportional to the intensity of a magnetic field detected in a plane perpendicular to the sensing surface 32 of the transducer. This transducer is an "off the shelf" transducer and in this particular application it is one manufactured by Analog Devices and combines integrated bulk Hall Cell Technology and instrumentation circuitry to minimize temperature related drifts associated with silicon Hall Cell characteristic. It uses a minimum number of components and one of its principal features is that it includes dynamic offset drift cancellation and a built-in temperature sensor. It is designed for 5-volt supply operation and achieves load drift offset and gain operation over a temperature range of between −40° C. to 150° C. Thus, such a transducer is ideal for field operation by construction workers or the like.

A microcontroller 33, also an "off the shelf" component is utilized to process the output signals from the transducer and provide signals to a numerical measurement display device, herein digital display LED devices 34 to provide a numerical indication of the thickness of a barrier being measured. The microcontroller further provides voltage signals to the piezoelectric crystal 29 to generate an audible signal. It also energizes the LEDs 15, only one being herein illustrated in FIG. 2.

As hereinshown the 9-volt battery 13 is connected to a voltage regulator circuit 35 to provide the proper voltage supply to the devices of the circuit and this supply is switched "on" and "off" by the reset switch 17 as previously described. The diode 36 provides the proper regulated voltage supply to the microcontroller 33. The microcontroller is activated by the supply at its input 37 and its return to ground at its output 38 via the resistance 39 and its current limiting transistor 40 which connects to ground. Resistor 41 switches the transistor 42 in order to provide a continuous current path between the battery 13 and the microcontroller 33.

The microcontroller 33 is provided with a memory whereby to store a reference signal value therein and calibrated to a maximum signal strength of the magnet. This is done by positioning the magnet directly adjacent the transducer sensing surface 32 and programming this signal value (the maximum signal strength intensity) in the memory as a reference signal. This is effected by the manufacturer and not by the user. Accordingly, the microcontroller has a reference signal to compare with detected signals and with this comparison it determines the location of the maximum strength intensity of the secured magnetic field and can determine the thickness of the barrier being sensed by the device. For example, with reference to FIG. 3 there is shown the characteristic curve 45 of a magnet of known magnetic field strength intensity. The vertical scale 46 indicates the thickness of a wall whereas the horizontal scale 47 indicates a voltage signal value indicative of this thickness. For example, if the thickness of the wall is 6 inches the maximum detected signal voltage value will be approximately 1.4 volts. This signal is treated by the microcontroller and it displays on the digital display LED devices 34 the numerical value of "06" indicating a 6 inch thick wall.

Referring again to FIG. 2, the resistance 55 provides for thermal compensation for the surrounding temperature of the transducer. Resistances 56 and 57 are part of the gain amplifier for the output signal. Resistance 58 is used for the resetting of the transducer to zero when the switch 17 is closed. The RC circuit comprised of resistant 59 and capacitor 60 acts as a noise filter for the transducer. The filter output signal is fed to the input 61 of the microcontroller 33. It is an analog signal of 10 bits which is converted into a numerical signal from zero to one thousand twenty-three for a variation of voltage between 1 and 2.5 volts. This signal is illustrated in FIG. 3.

The input 61 and 37 of the microcontroller serve as offset and the input connection 62 provides a 1 volt negative reference voltage. The input connection 63 provides a +2.5 volts reference signal.

Resistances 64 and 65 determine the voltage at the input connection 62 where as resistances 66 and 67 establish the voltage at the input connection 63. The microcontroller has an external oscillator 68 of 20 MHZ for its operation. The connectors 69, 70 and 71 are used for programming the microcontroller. A series of connections 72 are used to feed the two digital display LED devices 34, the signals of each LEDs 34 are multiplexed by the circuits 73 and 74 respectively and they are provided by two resistances and a transistor.

The housing 11 is provided with an open end 28 which is reinforced by a nylon bushing 27 or other wear resistant material. The sensing surface 32 of the transducer is positioned in close proximity to this open end. It is important to note that the housing 11 protects the circuitry from contact from the human hand as the humidity in the hand of a user could affect the performance of the electronic circuitry, particularly the sensor 30. Thus, it is a protection housing for the circuitry.

Referring now to FIGS. 4 and 5, there will be described the method of use of the magnetic field position sensing device of the present invention. As shown in FIG. 4, and as previously described, the magnet 20 is secured on a surface of a barrier at an area where it is desirable to pierce a hole. The magnet is mounted as illustrated in FIG. 4 to orient the magnetic field 25 as illustrated. However, before doing so, it is preferable to detect the position of that hole from the opposed surface of the barrier to make sure that there are no obstructions on the other surface or to make sure that the hole will exit at a desired accessible location. Once that location is detected then the user person has sufficient information to either drill a hole at that location or move it to another desirable location which is clear of obstacles on opposed sides of the barrier. After the magnet is attached to the surface 24', the sensing device 10 is disposed on the opposed sides of the wall and held transverse to the surface in proximity of the magnet area and the device is switched on by the switch 17. The device is positioned with the open end 28 disposed against the surface as illustrated in FIG. 4. The device is then rotated in a spiral path until audible and visual signals are generated by the speaker 29 and LEDs 15 indicating to the user person that the magnetic field 25 has been detected. By continuing the rotation of the sensor in the spiral path there will be changes in the tone of the signal emitted by the speaker and the number of LEDs lit. The sensor is continuously rotated in the spiral path, as illustrated by reference numeral 50 in FIG. 5 in a diminishing fashion to locate the maximum audible tone and the energization of all light emitting diodes 15. Thus, the center axis 51 of the magnet is located. This spiral displacement is effected in a radius of about 24 inches which is usually sufficient for the user person. However, this can be increased substantially. This device is precise within about an inch of this central axis. It is pointed out that the device could operate with only the piezoelectric crystal 29 or the visual indicator 15, but both are preferable.

During this diminishing spiral rotation of the sensing device, the magnetic field sensor 30 feeds signals at its output to the microcontroller which stores approximately three of these readings in memory. It treats these signals and compares it with the reference signal and thus provides a substantially accurate calculation of the strongest point of the magnetic field intensity detected and provides a read out display to the digital display LED devices 34. Accordingly, the sensing device detects the location of the magnet 20 from an opposed surface of the wall 24 as well as detecting the thickness of that wall by sensing the magnetic field intensity on the other side and comparing it with the stored reference value. An indicator mark is then made at the center location. If the mark is on an undesirable obstruction, then the mark is displaced at its displacement distance is measured whereby the magnet can also be displaced to a desired position. An unobstructed hole can then be made through the wall. It is pointed out that the sensing device can sense the magnetic field through wood, concrete, gypsum walls, plastic, metal, etc. However, when sensing through metal it is necessary to adjust the circuit program to compensate for the effect of metal on the magnetic field in order to measure thickness only.

It is within the ambit of the present invention to cover any obvious modifications of the example described herein, provided such modifications fall within the scope of the appended claims.

The invention claimed is:

1. A magnetic field position sensing device for sensing the position, on a front surface of a barrier of a magnet of known magnetic field intensity secured to a rear surface of said barrier; said magnet having attachment means to retain same on said rear surface, said sensing device having a housing in which is mounted a linear magnetic field transducer which generates output voltage signals to a microcontroller proportional to a detected magnetic field intensity of said magnet, said microcontroller having a reference signal value stored in a memory thereof and calibrated to a maximum signal strength of said magnet when positioned directly adjacent said transducer without obstruction, a digital display device connected to said microcontroller for displaying a visual digital value of said detected magnetic field intensity which is indicative of the thickness of said barrier, audible/visual means for transmitting an audible signal representative of measured values of said field intensity as said transducer is displaced on said front wall surface by moving said housing in a diminishing spiral path to locate a center position of said magnet where said magnetic field intensity is the greatest and modifying said visual digital value display accordingly whereby to locate the position of said magnet relative to said front surface of said barrier and determining the thickness of said barrier.

2. A magnetic field position sensing device as claimed in claim 1 wherein said visual means is comprised by two or more light emitting diodes to provide an indication of the measured signal values of said magnetic field strength and said center position.

3. A magnetic field position sensing device as claimed in claim 2 wherein said transducer is positioned at an open end of said housing and in close proximity thereof, said housing protecting said sensor and said microcontroller and further electronic components associated therewith from foreign elements and humidity from the hand of a user person.

4. A magnetic field position sensing device as claimed in claim 3 wherein there is further provided a 9 volt battery removably secured in said housing and a voltage regulator circuit connected to said battery to supply said sensing device, and a reset switch on said housing to switch said battery "on" and "off" to reset said transducer.

5. A magnetic field position sensing device as claimed in claim 4 wherein a level vial is integrated in a surface of said housing.

6. A magnetic field position sensing device as claimed in claim 2 wherein said attachment means is a suction cup attachment secured to said magnet.

7. A magnetic field position sensing device as claimed in claim 2 wherein said magnet is comprised of two or more magnet wafers disposed in facial contact with one another, said known magnetic field being modified by changing the number of said magnet wafers.

8. A magnetic field position sensing device as claimed in claim 1 wherein said barrier is a wall.

9. A method of sensing a magnetic field, using a magnetic field position sensing device as defined by claim 1, on a front surface of a barrier wall of a magnet secured to a rear surface of said barrier wall to indicate the position of said magnet and the thickness of said barrier wall, said method comprising the steps of:
   i) attaching a magnet of known magnetic field intensity to a location on said rear surface of said barrier;
   ii) placing a sensing device on said front surface with a linear magnetic field transducer of said device being positioned adjacent said from surface;
   iii) observing an audible/visual signal emitted by said sensing device;
   iv) displacing said device in a diminishing spiral path as indicated by an increasing value of said audible/visual signals to locate a center position of said magnet; and
   v) generating signals to display a digital value indicative of the thickness of said barrier, and wherein there is further provided the step of storing in the memory of the microcontroller of the sensing device a reference signal value indicative of a maximum signal strength of the magnet when positioned directly on the magnet without obstruction.

10. A method as claimed in claim 9 wherein said microcontroller compares output signals from said transducer to said reference signal value and converts them into said digital value.

11. A method as claimed in claim 9 wherein said digital value is in inches, there further being provided the step of modifying the field intensity of said magnet by increasing or decreasing the number of magnetic wafers of said magnet.

12. A method as claimed in claim 9 wherein there is further provided the step of placing an indicator mark to indicate said center position to form a hole in said wall at said position.

13. A method as claimed in claim 12 wherein there is further provided the step of displacing said indicator mark to a measured location relative to the position of said magnet when said indicator mark is obstructed by an undesirable element.

\* \* \* \* \*